US00RE39374E

(19) United States
(12) Reissued Patent
Manabe et al.

(10) Patent Number: US RE39,374 E
(45) Date of Reissued Patent: Nov. 7, 2006

(54) CONSTANT VOLTAGE POWER SUPPLY WITH NORMAL AND STANDBY MODES

(75) Inventors: Shinya Manabe, Hyogo (JP); Kohji Yoshii, Hyogo (JP)

(73) Assignee: Ricoh Company, Ltd., Tokyo (JP)

(21) Appl. No.: 10/423,864

(22) Filed: Apr. 28, 2003

Related U.S. Patent Documents

Reissue of:
(64) Patent No.: 6,236,194
Issued: May 22, 2001
Appl. No.: 09/633,148
Filed: Aug. 4, 2000

(30) Foreign Application Priority Data

Aug. 6, 1999 (JP) ..... 11-224511
Jul. 24, 2000 (JP) ..... 2000-221725

(51) Int. Cl.
*G05F 1/59* (2006.01)

(52) U.S. Cl. ..... 323/274; 323/284
(58) Field of Classification Search ..... 323/273, 323/274, 282, 284
See application file for complete search history.

(56) References Cited

U.S. PATENT DOCUMENTS 4,410,766 A * 10/1983 Beirne ..... 323/284
5,747,977 A * 5/1998 Hwang ..... 323/284
6,127,816 A * 10/2000 Hirst ..... 323/284

* cited by examiner

*Primary Examiner*—Jeffrey Sterrett
(74) *Attorney, Agent, or Firm*—Dickstein Shapiro LLP

(57) ABSTRACT

A first constant voltage circuit includes an operational amplifier having a reference voltage applied to a first input terminal thereof and a voltage obtained as a result of an output voltage being divided applied to a second input terminal thereof, and controls an output transistor with an output of its operational amplifier. A second constant voltage circuit includes an operational amplifier having a reference voltage applied to a first input terminal thereof and a voltage obtained as a result of the output voltage being divided applied to a second input terminal thereof, and controls the output transistor with an output of its operational amplifier, a current consumption of the second constant voltage circuit being smaller than a current consumption of the first constant voltage circuit. A switching part is provided for each of those operational amplifiers and makes connection and disconnection between an output terminal of the operational amplifier and the output transistor. A switching logic circuit controls the switching units so that the first constant voltage circuit is connected to the output transistor when the load is in the operation condition but the second constant voltage circuit is connected to the output transistor when the load is in the standby condition.

13 Claims, 7 Drawing Sheets

CONSTANT VOLTAGE POWER SUPPLY WITH NORMAL AND STANDBY MODES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to a constant voltage power supply, and, in particular, to a constant voltage power supply supplying power to a loading having an operation condition and a standby condition switched to one another.

2. Description of the Related Art

A constant voltage power supply having a constant voltage circuit (Voltage Regulator, referred to as a VR, hereinafter) and supplying power in a stable voltage is used in a cellular phone or the like. Such a constant voltage power supply has a constant voltage circuit (high-speed VR) having a large power (current) consumption in order to improve a PSRR (ripple removal rate) and a load transient responsivity. Therefore, when such a constant voltage power supply is applied to a device such as a cellular phone which has an active mode (operation condition) and a sleep mode (standby condition), useless power (current) consumption is large in the sleep mode in which high PSRR and load transient responsivity are not needed.

In order to solve such a problem, a constant voltage power supply is considered which has the high-speed VR and also another VR (low-speed VR) having lower PSRR and load transient responsivity but having a smaller power (current) consumption and has function of switching VRs in accordance with the condition of a load. Although the low-speed VR has the PSRR and load transient responsivity lowered as a result of having the smaller power (current) consumption, there is no problem when the load is in the sleep mode.

A configuration shown in FIG. 1 is considered for configuring a constant voltage power supply having the high-speed VR and low-speed VR.

In order to supply power to a load 3 from a power-source voltage applying terminal 1 stably, a high-speed VR 5a and a low-speed VR 5b are provided. For example, the high-speed VR 5a and low-speed VR 5b have transistors having different sizes but having the same configuration. Specifically, the size of the transistor of the high-speed is such as to have a large current supply capability. The high-speed VR 5a and low-speed VR 5b have input terminals (Vbat) 7a and 7b to which the power-source voltage applying terminal 1 is connected, reference voltage parts (Vref) 9a and 9b, operational amplifiers (OPAMP) 11a and 11b, output transistors (P-channel MOS transistors: DRV) 13a and 13b, voltage-dividing resistors R1, R2 and R3, R4, and output terminals 15a and 15b, respectively.

In the high-speed VR 5a, the output terminal of the operational amplifier 11a is connected to the gate electrode of the output transistors 13a, the reference voltage Vref is applied to the inverted input terminal of the operational amplifier 11a by the reference voltage part 9a, the voltage obtained as a result of the output voltage Vout being divided by the resistors R1 and R2 is applied to the non-inverted input terminal of the operational amplifier 11a, and control is performed such that the voltage obtained as a result of the output voltage Vout being divided by the resistors R1 and R2 is equal to the reference voltage.

The high-speed VR 5a and low-speed VR 5b enclosed by broken lines, respectively, are formed on separate chips, respectively.

The output terminals 15a and 15b of the high-speed VR 5a and low-speed VR 5b are connected to the load 3 through a switching unit 17. The load 3 has an active mode in which the power consumption is tens of mA and a sleep mode in which the power consumption is tens of μA switched to one another. A switching logic circuit (switching LOGIC) 19 which outputs switching signals to the switching unit 17 is connected to the load 3. The switching logic circuit 19 outputs to the switching unit 17 a switching signal "H" when the load 3 is in the active mode but a switching signal "L" when the load 3 is in the sleep mode. The switching unit 17 connects the output terminal 15a of the high-speed VR 5a to the load 3 when having the switching signal "H" input thereto, but connects the output terminal 15b of the low-speed VR 5b to the load 3 when having the switching signal "L" input thereto. Thus, the high-speed VR 5a or low-speed VR 5b is selected in accordance with the condition of the load 3.

Each of the high-speed VR 5a and low-speed VR 5b enters a standby condition when not being selected, and have the power (current) consumption equal to or smaller than 1 μA.

Thus, the high-speed VR 5a is selected when the load 3 is in the active mode, but the low-speed VR 5b is selected when the load 3 is in the sleep mode. Thereby, the power (current) consumption is appropriately controlled.

However, in the configuration shown in FIG. 1, when the high-speed VR 5a, low-speed VR 5b and switching unit 17 are mounted on one chip (semiconductor chip), the two output transistors 13a and 13b need large areas thereon. Further, because the switching unit 17 needs to have a capability of having a current flowing therethrough equivalent to the output transistors 13a and 13b, and thus to have a low resistance, it also needs a large area. Thus, when this configuration is achieved on one chip including the switching unit 17, the chip area is considerably large.

SUMMARY OF THE INVENTION

An object of the present invention is to provide a constant voltage power supply which can appropriately control a current flowing through VR in accordance with the condition of a load without having the above-described problem.

A constant voltage power supply, according to a first aspect of the present invention, supplying power to a load having an operation condition and a standby condition switched to one another, comprises:

a first constant voltage circuit comprising a first operational amplifier having a reference voltage applied to a first input terminal thereof and a voltage obtained as a result of an output voltage being divided applied to a second input terminal thereof, and controlling an output transistor with an output of the first operational amplifier;

a second constant voltage circuit comprising a second operational amplifier having a reference voltage applied to a first input terminal thereof and a voltage obtained as a result of the output voltage being divided applied to a second input terminal thereof, and controlling the output transistor with an output of the second operational amplifier, a current consumption of the second constant voltage circuit being smaller than a current consumption of the first constant voltage circuit;

a switching part provided for each of the first and second operational amplifiers and making connection and disconnection between an output terminal of the operational amplifier and the output transistor; and a switching logic circuit controlling the switching units so that the first operational amplifier is connected to the output transistor when the load is in the operation condition but the second operational amplifier is connected to the output transistor when the load is in the standby condition.

When the load is in the operation (working) condition, the output transistor is controlled by the output of the first operational amplifier, but the output transistor is controlled by the output of the second operational amplifier having the smaller current consumption (power consumption) when the load is in the standby condition. Thereby, it is possible to reduce the current consumption.

Further, the output transistor is common to the first and second constant voltage circuits. Accordingly, it is possible to reduce an area of a chip when the constant voltage power supply is achieved on the one chip.

Further, the switching units are used to control supply of merely a control signal controlling the output transistor. Accordingly, the switching units need a small area on the chip. Accordingly, it is possible to prevent the necessary area on the chip from increasing even when the two switching units are provided.

A constant voltage power supply, according to a second aspect of the present invention, supplying power to a load having an operation condition and a standby condition switched to one another, comprises an operational amplifier having a reference voltage applied to a first input terminal thereof and a voltage obtained as a result of an output voltage being divided applied to a second input terminal thereof, and controls an output transistor with an output of the operational amplifier.

The power supply further comprises:

a parallel circuit of two transistors provided in a current path of the operational amplifier and having different current capacities; and a switching object circuit controlling the parallel circuit so that the transistor of the parallel circuit having a larger current capacity is turned on when the load is in the operational condition but the transistor of the parallel circuit having a smaller current capacity is turned on when the load is in the standby condition.

In this arrangement, the current consumption of the constant voltage power supply is made larger when the load is in the operation condition but is made smaller when the load is in the standby condition. Accordingly, it is possible to reduce the current consumption. Further, because only one set of the operational amplifier and output transistor are provided, it is possible to further reduce an area on a chip when the constant voltage power supply is achieved on the one chip.

Other objects and further features of the present invention will become more apparent from the following detailed description when read in conjunction with the accompanying drawings.

DETAILED DESCRIPTION OF THE PREFERRED EMBODIMENTS

According to the first aspect of the present invention, in order to cause a first constant voltage circuit and a second constant voltage circuit to have different current consumptions, it is preferable that the first operational amplifier and second operational amplifier have the same circuit configuration but the first operational amplifier uses a transistor having a current supply capability larger than that of a transistor of the second operational amplifier.

As a result, configurations of the first operational amplifier, second amplifier, and, as a result, the configuration of the constant voltage power supply itself are simplified.

Further, according to the first aspect of the present invention, in order to cause the first constant voltage circuit and second constant voltage circuit to have different current consumptions, it is preferable that the first operational amplifier has a buffer transistor in an output stage having a large current supply capability in comparison to the a second operational amplifier.

As a result, it is possible that the first and second operational amplifiers have the same configuration except the buffer transistor, and, thereby, manufacture thereof is easier.

Figure 1:
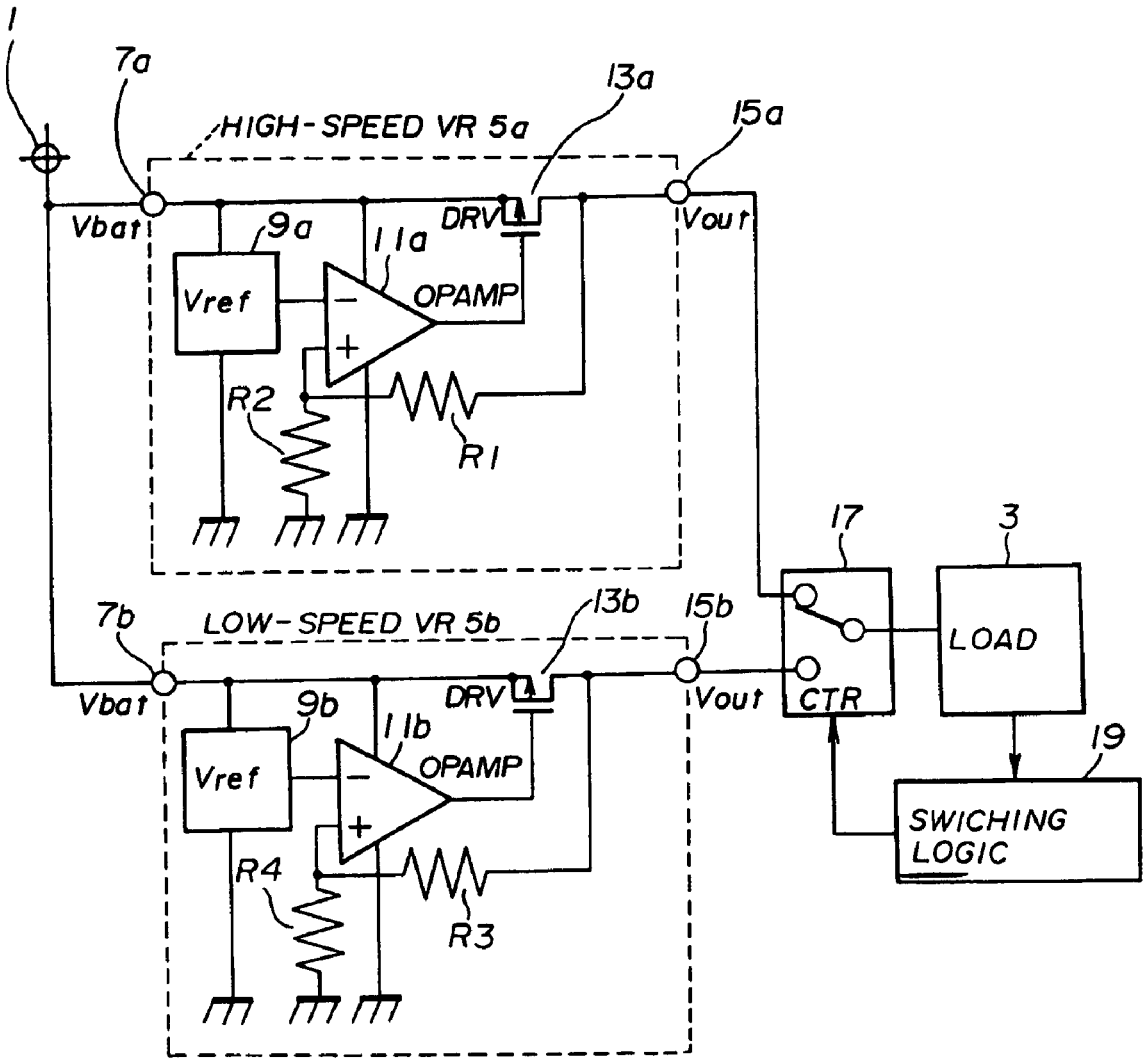
FIG. 1 is a circuit diagram showing an expected constant voltage power supply having a high-speed VR and a low-speed VR.

In the configuration shown in FIG. 1, when switching between the high-speed VR 5a and low-speed VR 5b is performed, noise occurs in the output of the switching unit 17 which is regarded as a power source for the load 3. Such noise may cause the load 3 to recognize it as a reset instruction and thus malfunction.

In order to solve such a problem, according to the first aspect of the present invention, it is preferable that the switching logic circuit controls the switching units so that a period during which operational amplifiers of both constants voltage circuits are connected to the output transistor is provided after the switching of the condition of the heat.

As a result, in switching of the constant voltage circuits, noise such that the output level fluctuates greatly can be effectively reduced.

Also according to the second aspect of the present invention, it is preferable that the switching logic circuit controls the parallel circuit so that a period during which both transistors of the parallel circuit are turned on after the condition of the load is switched.

As a result, ln switching in the parallel circuit, noise such that the output level fluctuates greatly can be effectively reduced.

Further, according to the first aspect of the present invention, an interrupting circuit interrupting a passing-through current may be provided in each of the first and second constant voltage circuits. Then, the switching logic circuit may preferably control the interrupting circuits so that the interrupting circuit of the first constant voltage circuit is turned on while the interrupting circuit of the second constant voltage circuit is turned off when the load is in the operation condition, but the interrupting circuit of the first constant voltage circuit is turned off while the interrupting circuit of the second constant voltage circuit is turned on when the load is in the standby condition.

As a result, it is possible to further reduce the current consumption of the first and second constant voltage circuits when they are not selected.

Figure 2:
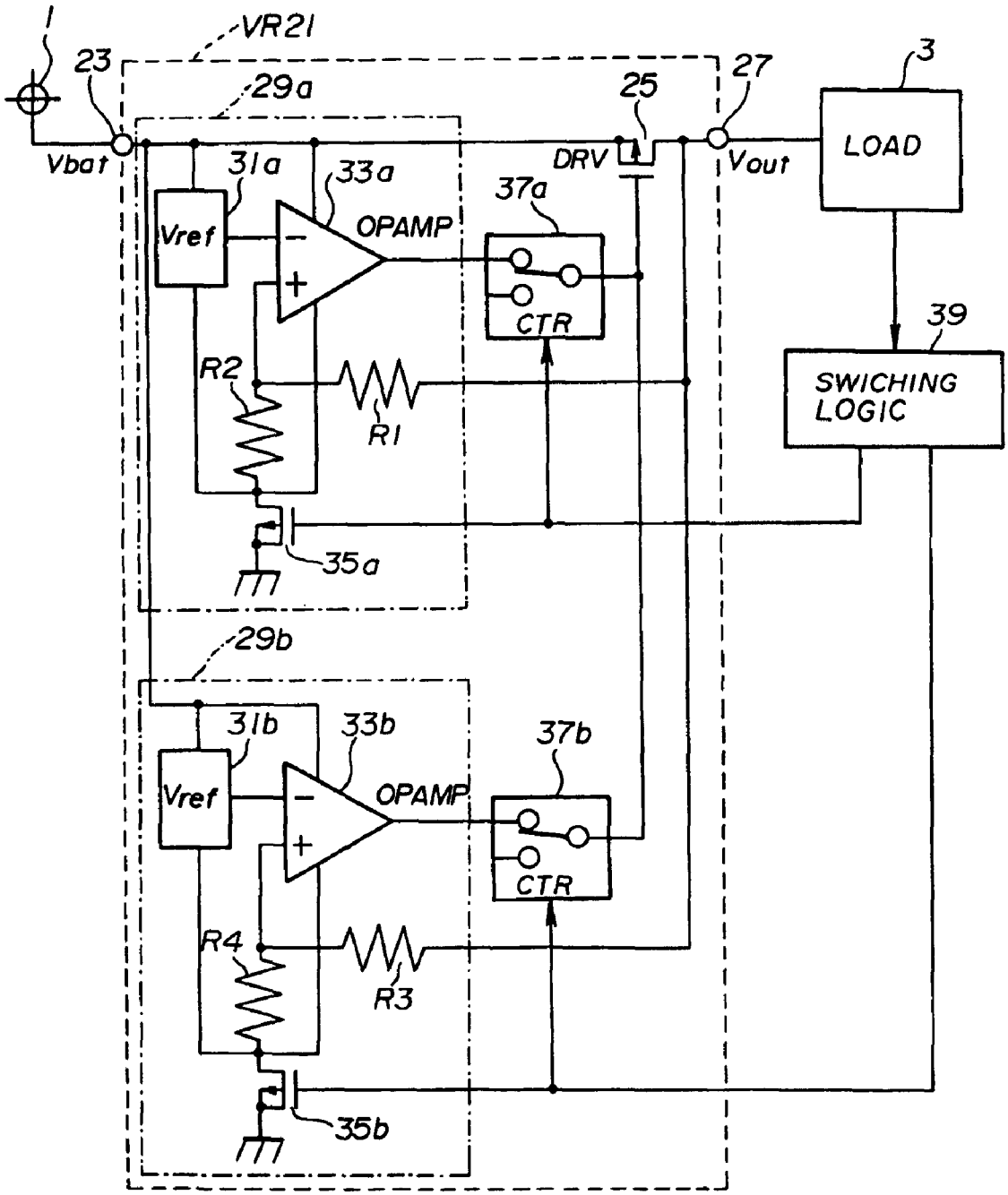
FIG. 2 is a circuit diagram showing a constant voltage power supply in a first embodiment of the present invention.

FIG. 2 is a circuit diagram showing a constant voltage power supply in a first embodiment of the first aspect of the present invention;

A VR 21 is provided for supplying power to a load 3 such as that of a cellular phone or the like from a power-source voltage applying terminal 1. The power-source voltage applying terminal 1 is connected to an input terminal (Vbat) 23 of the VR 21. The input terminal 23 is connected to an output terminal (Vout) 27 through an output transistor (P-channel MOS transistor: DRV) 25.

The VR 21 has a high-speed voltage stabiliziing part 29a having a large current consumption but having superior PSRR and load transient responsivity, and a low-speed voltage stabilizing part 29b having a small current consumption but having inferior PSRR and load transient responsivity provided in parallel. The high-speed voltage stabilizing part 29a uses transistors having sizes such that the transistors have current supply capabilities larger than those of (corresponding) transistors (or a transistor having a size such that the transistor has a current supply capability larger than that of a (corresponding) transistor) of the low-speed voltage stabilizing part 29b. Although the high-speed voltage stabilizing part 29a and low-speed voltage stabilizing part 29b have the same circuit configuration, the have different responsivities due to difference in magnitudes of currents flowing through operational amplifiers thereof. Specifically, the high-speed voltage stabilizing part 29a has the responsivity quicker than that of the low-speed voltage stabilizing part 29b, that is, the response time of the high-speed voltage stabilizing part 29a is shorter than that of the low-speed stabilizing part 29b.

The high-speed voltage stabilizing part 29a has an operational amplifier (OPAMP) 33a. The output terminal of the operational amplifier 33a is connected to the gate of the output transistor 25 through a switching unit 37a provided in the VR 21. A reference voltage is applied to the inverted input terminal of the operational amplifier 33a from a reference voltage part (Vref) 31a (including a Zener diode or the like). A voltage obtained as a result of the output voltage of the output transistor 25 being divided by voltage-dividing resistors R1 and R2 is applied to the non-inverted input terminal of the operational amplifier 33a. The power-source voltage applying terminal 1 applies the power-source voltage to the operational amplifier 33a and reference voltage part 31a. A P-channel MOS transistor acting as an interrupting circuit 35a which controls the passing-through current is connected between the respective ground terminals of the operational amplifier 33a, reference voltage part 31a and resistor R2, and the ground.

The low-speed voltage stabilizing part 29b has the same configuration as that of the high-speed voltage stabilizing part 29a, and has a reference voltage part 31b, an operational amplifier 33b, an interrupting circuit 35b, and resistors R3, R4, corresponding to the reference voltage part 31a, operational amplifier 33a, interrupting circuit 35a, and resistors R1, R2, respectively. The output terminal of the operational amplifier 33b is connected to the gate of the output transistor 25 through a switching unit 37b provided in the VR 21.

The operational amplifier 33b has current consumption smaller than that of the operational amplifier 33a, and the low-speed voltage stabilizing part 29b has the PSRR and load transient responsivity interior to those of the high-speed voltage stabilizing part 29a.

A switching logic circuit (switching LOGIC) 39 outputting switching signals to the switching units 37a and 37b is connected to the load 3. The switching units 37a and 37b control connection/disconnection between the output terminals of the operational amplifiers 33a and 33b, and the gate electrode of the output transistor 25. Each of the units 37a and 37b makes the connection when having a switching signal "H" input thereto but the disconnection when having a switching signal "L" input thereto. The switching logic circuit 39 is also connected to the interrupting circuit 35a and 35b, and controls the operations of the interrupting circuits 35a and 35b correspondingly to the signals input to the switching units 37a and 37b.

The VR 21 enclosed by a broken line is formed on one chip.

The above-mentioned first constant voltage circuit includes the high-speed voltage stabilizing part 29a and output transistor 25, and second constant voltage circuit includes the low-speed voltage stabilizing part 29b and output transistor 25.

Figure 3:
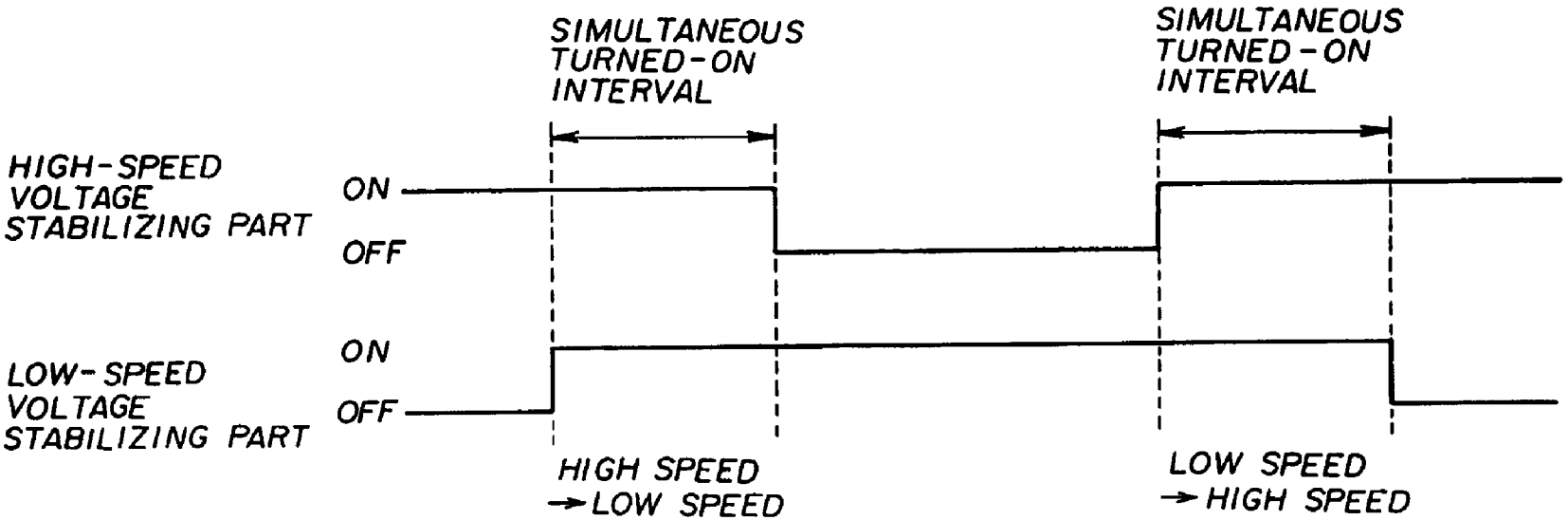
FIG. 3 shows a waveforms illustrating operation sequences of a high-speed voltage stabilizing part and a low-speed voltage stabilizing part in the first embodiment shown in FIG. 2.

FIG. 3 shows waveforms showing operation sequences of the high-speed voltage stabilizing part 29a and low-speed voltage stabilizing part 29b. Operations of the first embodiment will now be described with reference to FIGS. 2 and 3.

When the load 3 is in the active mode (operation condition), the switching logic circuit 39 outputs the switching signal "H" to the switching unit 37a and interrupting circuit 35a, while outputs the switching signal "L" to the switching unit 37b and interrupting circuit 35b. Thereby, the connections are made by the switching unit 37a and interrupting circuit 35a, and, thereby, the high-speed voltage stabilizing part 29a is turned on, while the disconnections are made by the switching unit 37b and interrupting circuit 35b, and, thereby, the low-speed voltage stabilizing part 29b is turned off (standby condition). Thereby, the voltage applied to the gate electrode of the output transistor 25 is controlled by the high-speed voltage stabilizing part 29a. The current consumption of the low-speed voltage stabilizing part 29b in the standby condition is equal to or smaller than 1 μA.

When the load 3 is in the sleep mode (standby condition) the switching logic circuit 39 outputs the switching signal "L" to the switching unit 37a and interrupting circuit 35a, while outputs the switching signal "H" to the switching unit 37b and interrupting circuit 35b. Thereby, the disconnections are made by the switching unit 37a and interrupting circuit 35a, and, thereby, the high-speed voltage stabilizing part 29a is turned off (standby condition), while the connections are made by the switching unit 37b and interrupting circuit 35b, and, thereby, the low-speed voltage stabilizing part 29b is turned on. Thereby, the voltage applied to the gate electrode of the output transistors 25 is controlled by the low-speed voltage stabilizing part 29b. The current consumption of the high-speed voltage stabilizing part 29a in the standby condition is equal to or smaller than 1 μA.

As shown in FIG. 3, when the operation mode is switched, the switching logic circuit 39 generates an interval during which both the high-speed voltage stabilizing part 29a and low-speed voltage stabilizing part 29b controlling the operation of the output transistor 25 are turned on simultaneously. When the load 3 enters the sleep mode from the active mode, the load 3 transmits a mode switching signal to the switching logic circuit 39, and, in response thereto, the switching logic circuit 39 turns on the low-speed voltage stabilizing part 29b, and, after a predetermined time has elapsed since then, turns off the high-speed stabilizing part 29a, and, thus, switching is made such that the control by the low-speed voltage stabilizing part 29b is started. Thereby, the hig-speed voltage stabilizing part 29a is not selected, and enters the standby condition.

When the load 3 enters the active mode from the sleep mode, the load 3 transmits a mode switching signal to the switching logic circuit 39, and, in response thereto, the switching logic circuit 39 turns on the high-speed voltage stabilizing part 29a, and, after a predetermined time has elapsed since then, turns off the low-speed voltage stabilizing part 29b, and, thus, switching is made such that the control by the high-speed voltage stabilizing part 29a is started. Thereby, the low-speed voltage stabilizing part 29b is not selected, and enters the standby condition.

Thus, the simultaneous turned-on condition is produced when switching is made such that either low-speed voltage stabilizing part 29b→high speed voltage stabilizing part 29a or high-speed voltage stabilizing part 29a→low speed voltage stabilizing part 29b. Thereby, it is possible to avoid noise such as great fluctuation in the output Vout from occurring when the switching is made.

Further, in the first embodiment, it is possible to reduce a difference in the output voltage between before and after the switching. The difference in the output voltage exhibited by the first embodiment will now be compared with the configuration shown in FIG. 1. The difference in the output voltage exhibited by the configuration of FIG. 1 is Vref-off (reference voltage offset voltage)+R-off (resistor offset voltage)−OPAMP-off (operational amplifier offset voltage)+DRV-off (output transistor offset voltage). In contrast to this, in the first embodiment, the difference in the output voltage is Vref-off+R-off+OPAMP-off. Thus, it is possible to reduce the difference in the output voltage by the amount of the offset voltage of the output transistor.

Further, when the VR 21 is integrated into one chip, it is possible to achieve it with a reduced area because only the single output transistor is included, in comparison to the configuration shown in FIG. 1.

Furthermore, it is not necessary for the switching units 37a and 37b to have a large current flowing therethrough because they merely control the control voltage of the gate electrode of the output transistor. Accordingly, one chip can be achieved with a reduced area.

In the embodiment shown in FIG. 2, the PSRR and load transient responsivities of the high-speed voltage stabilizing part 29a and low-speed voltage stabilizing part 29b are set as a result of the sizes of the transistors being differed therebetween. However, the present invention is not necessary to be limited to this manner. It is also possible to set the current consumption, that is, the PSRR and load transient responsivities of the high-speed voltage stabilizing part 29a and low-speed voltage stabilizing part 29b by appropriately setting the resistance values of the voltage-dividing resistors (feed-back resistors) R1, R2 and R3, R4.

Further, alternatively, it is also possible to set the PSSR and load transient responsivities of the high-speed voltage stabilizing part 29a and low-speed voltage stabilizing part 29b by making an arrangement such that the operational amplifier 33a of the high-speed voltage stabilizing part 29a and the operational amplifier 33b of the low-speed voltage stabilizing part 29b have different circuit configurations.

Figure 4A:
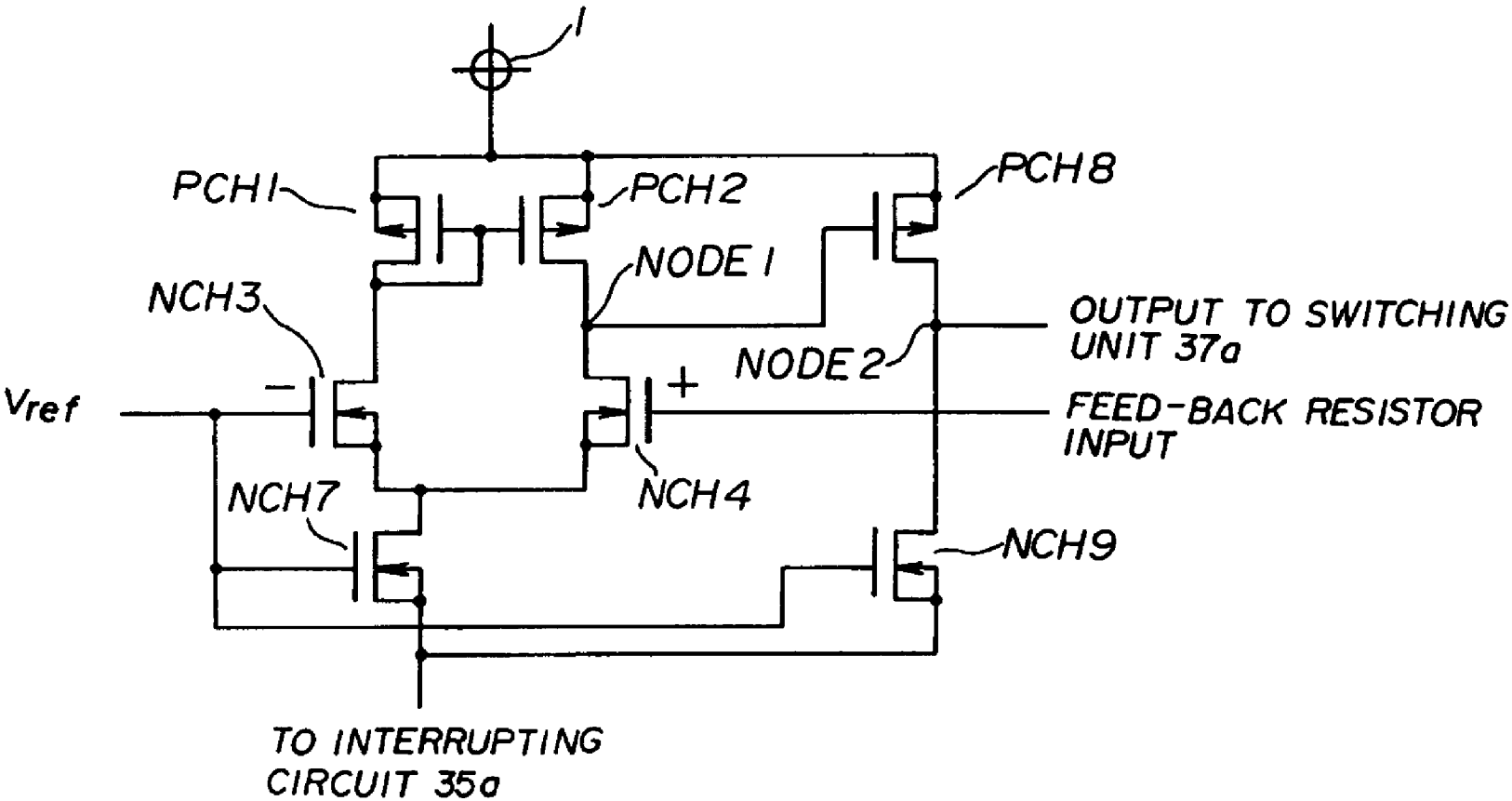
FIG. 4A is a circuit diagram showing a configuration example of an operational amplifier of the high-speed voltage stabilizing part of the first embodiment shown in FIG. 2.
Figure 4B:
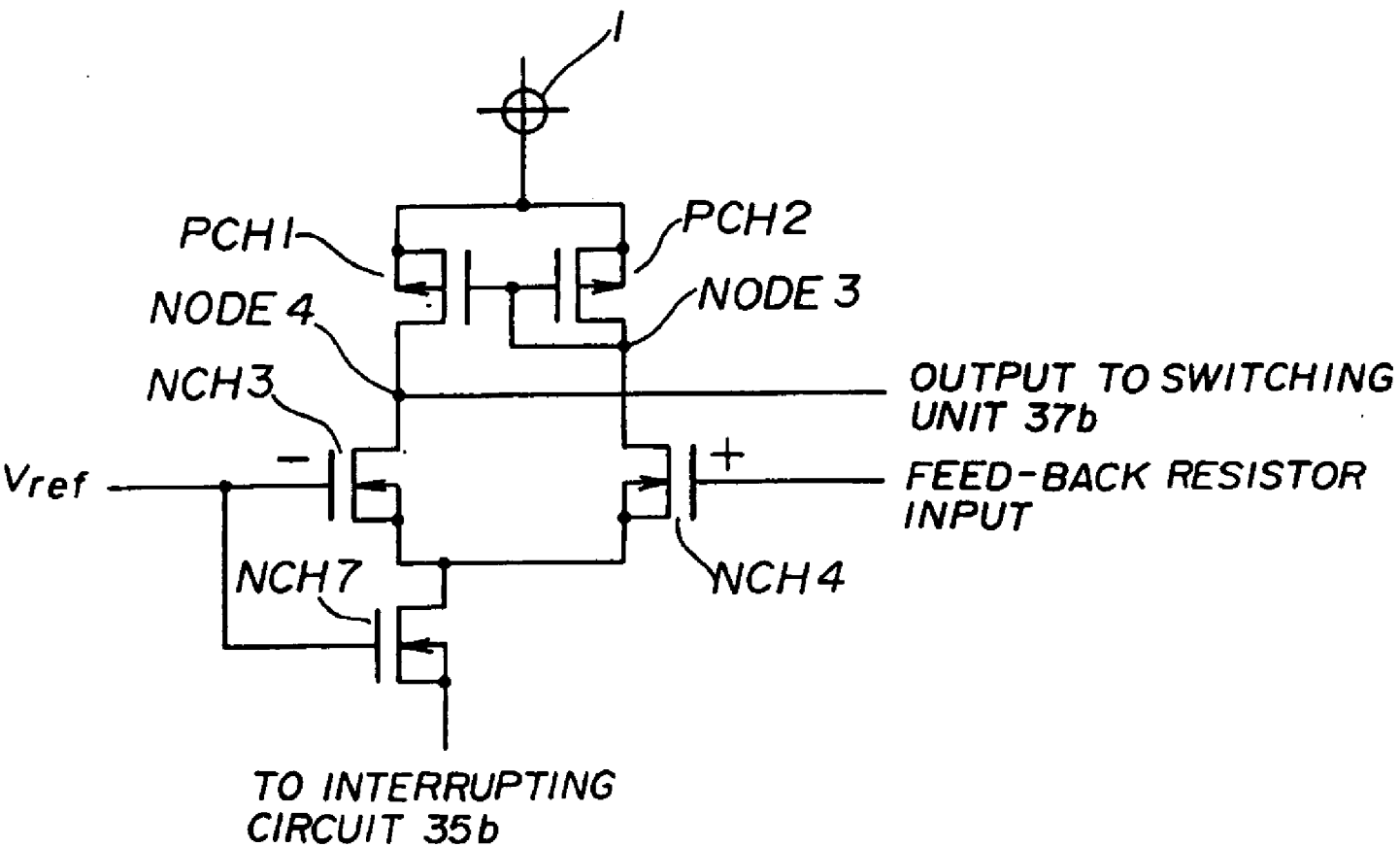
FIG. 4B is a circuit diagram showing a configuration example of an operational amplifier of the low-speed voltage stabilizing part of the first embodiment shown in FIG. 2.

FIG. 4A is a circuit diagram showing the operational amplifier for the high-speed voltage stabilizing part and FIG. 4B is a circuit diagram showing the operational amplifier for the low-speed voltage stabilizing part. The other part of the constant voltage power supply including those operational amplifiers is the same as that of the embodiment shown in FIG. 2. However, the operational amplifiers used in the present invention are not limited to those, and other ones including differential amplifier circuits can be applied thereto.

The operational amplifier for the high-speed voltage stabilizing part will now be described with reference to FIG. 4A.

The drains of a pair of NMOS transistors NCH3 and NCH4 for differential input are connected to the power-source voltage applying terminal 1 through PMOS transistors PCH1 and PCH2, respectively. The gate electrodes of the PMOS transistors PCH1 and PCH2 are connected to one another, and, are connected to the drain of any one of the NMOS transistors for input, for example, the NCH3. Thereby, the PMOS transistors PCH1 and PCH2 act as a load. The electric potential of the reference voltage part 31a is applied to the gate electrode of the NMOS transistor NCH3 for input, and the feed-back resistor electric potential (the electric potential obtained from the voltage division performed by the voltage-dividing resistors R1 and R2) is applied to the gate electrode of the NMOS transistor NCH4 for input. The sources of the NMOS transistors NCH3 and NCH4 for input are connected to one another, and are connected to the interrupting circuit 35a through an NMOS transistor NCH7. The gate electrode of the NMOS transistor NCH7 is connected to the reference voltage part 31a.

Further, a PMOS transmission PCH8 acting as a buffer circuit is provided, and the source thereof is connected to the power-source voltage applying terminal 1. The gate electrode of the PMOS transistor PCH8 is connected to a connection point NODE1 between the PMOS transistor PCH2 and NMOS transistor NCH4. The drain of the PMOS transistor PCH8 is connected to the interrupting circuit 35a through an NMOS transistor NCH9, and the gate electrode of the NMOS transistor NCH9 is connected to the reference voltage part 31a. A connection point NODE2 between the PMOS transistor PCH8 and NMOS transistor NCH9 acts as the output terminal of this operational amplifier, and is connected to the switching unit 75.

Operations of this operational amplifier for the high-speed voltage stabilizing part will now be described.

When the voltage of feed-back resistor input, that is, the gate voltage of NMOS transistor NCH4, increases, the current flowing through the NMOS transistor NCH4 increases, the voltage at the connection point NODE1 decreases, the gate voltage of the PMOS transistor PCH8 decreases, the current flowing through the PMOS transistor PCH8 increases, and the current flowing through the connection point NODE2 increases. Here, the gate voltage of the NMOS transistor NCH9 is the fixed electric potential from the reference voltage part 31a, and, thereby, the turned-on resistance of the NMOS transistor NCH9 is fixed. Accordingly, when the current flowing through the connection point NODE2 increases, the voltage thereof increases. Thus, the output of the operational amplifier increases when the voltage of the feed-back resistor input increases.

When the voltage feed-back resistor input, that is, the gate voltage of NMOS transistor NCH4, decreases, the current flowing through the NMOS transistor NCH4 decreases, the voltage is the connection point NODE1 increases, the gate voltage of the PMOS transistor PCH8 increases, the current flowing through the PMOS transistor PCH8 decreases, and the current flowing through the connection point NODE2 decreases. Here, the gate voltage of the NMOS transistor NCH9 is the fixed electric potential from the reference voltage part 31a, and, thereby, the turned-on resistance of the NMOS transistor NCH9 is fixed. Accordingly, when the current flowing through the connection point NODE2 decreases, the voltage thereof decreases. Thus, the output of the operational amplifier decreases when the voltage of the feed-back resistor input decreases.

The operational amplifier for the low-speed voltage stabilizing part will now be described with reference to FIG. 4B.

PMOS transistors PCH1, PCH2 and NMOS transistor NCH3, NCH4 and NCH7 are the same as those of FIG. 4A in size, and arranged and connected in the same configuration. In this operational amplifier, the gate electrodes of the PNMOS transistors PCH1 and PCH2 are connected to a connection point NODE3 at which the PMOS transistor PCH2 and NMOS transistor NCH4 are connected, and a connection point NODE4 provided between the PMOS transistor PCH1 and NMOS transistor NCH3 acts as the output terminal of the operational amplifier and connected to the switching unit 37b. In this operational amplifier, PMOS transistor PCH8 of the buffer circuit and NMOS transistor NCH9 in the configuration shown in FIG. 4A are not provided.

Operations of this operational amplifier for the low-speed voltage stabilizing part will now be described.

When the voltage of feed-back resistor input, that is, the gate voltage of NMOS transistor NCH4, increases, the current flowing through the NMOS transistor NCH4 increases, the voltage at the connection point NODE3 decreases, the gate voltages of the PMOS transistors PCH1 and PCH2 decreases, the current flowing through the PMOS transistors PCH1 and PCH2 increase, and the current flowing through the connection point NODE4 increases. Here, the gate voltages of the NMOS transistors NCH3 and NCH7 are the fixed electric potential from the reference voltage part 31b, and, thereby, the turned-on resistances of the NMOS transistors NCH3 and NCH7 are fixed. Accordingly, when the current flowing through the connection point NODE4 increases, the voltage thereof increases. Thus, the output of the operational amplifier increases when the voltage of the feed-back resistor input increases.

When the voltage of feed-back resistor input, that is, the gate voltage of NMOS transistor NCH4, decreases, the current flowing through the NMOS transistor NCH4 decreases, the voltage at the connection point NODE3 increases, the gate voltages of the PMOS transistors PCH1 and PCH2 increase the currents flowing through the PMOS transistors PC1 and PC2 decrease, and the current flowing through the connection point NODE4 decreases. Here, the gate wavelength of the NMOS transistors NCH3 and NCH7 are the fixed electric potential from the reference voltage part 31b, and, thereby, the turn-on resistances of the NMOS transistors NCH3 and NCH7 are fixed. Accordingly, when the current flowing through the connection point NODE4 decreases, the voltage thereof decreases. Thus, the output of the operational amplifier decreases when the voltage of the feed-back resistor input decreases.

When the operational amplifier for high-speed voltage stabilizing part shown in FIG. 4A is compared with the operational amplifier for low-speed voltage stabilizing part shown in FIG. 4B, the PMOS transistor PCH8 acting as the buffer circuit is provided in the operational amplifier for high-speed voltage stabilizing part, and, therein, change in electric potential at the NODE1 following change in the feed-back resistor input is amplified by the PMOS transistor PCH8, the thus-amplified electric potential is output as the output of the operational amplifier. Accordingly, the operational amplifier for high-speed voltage stabilizing part has increased PSRR and load transient responsivity in comparison to the operational amplifier for low-speed voltage stabilizing part. However, the current consumption of the operational amplifier for high-speed voltage stabilizing part is larger than that of the operational amplifier for low-speed voltage stabilizing part of the amount of the current flowing through the PMOS transistor PCH8.

The current consumption of the operational amplifier accounts for the majority of the current consumption of a VR. Therefore, the same effects can be obtained as a result of this current is switched in accordance with a condition of a system.

Figure 5A:
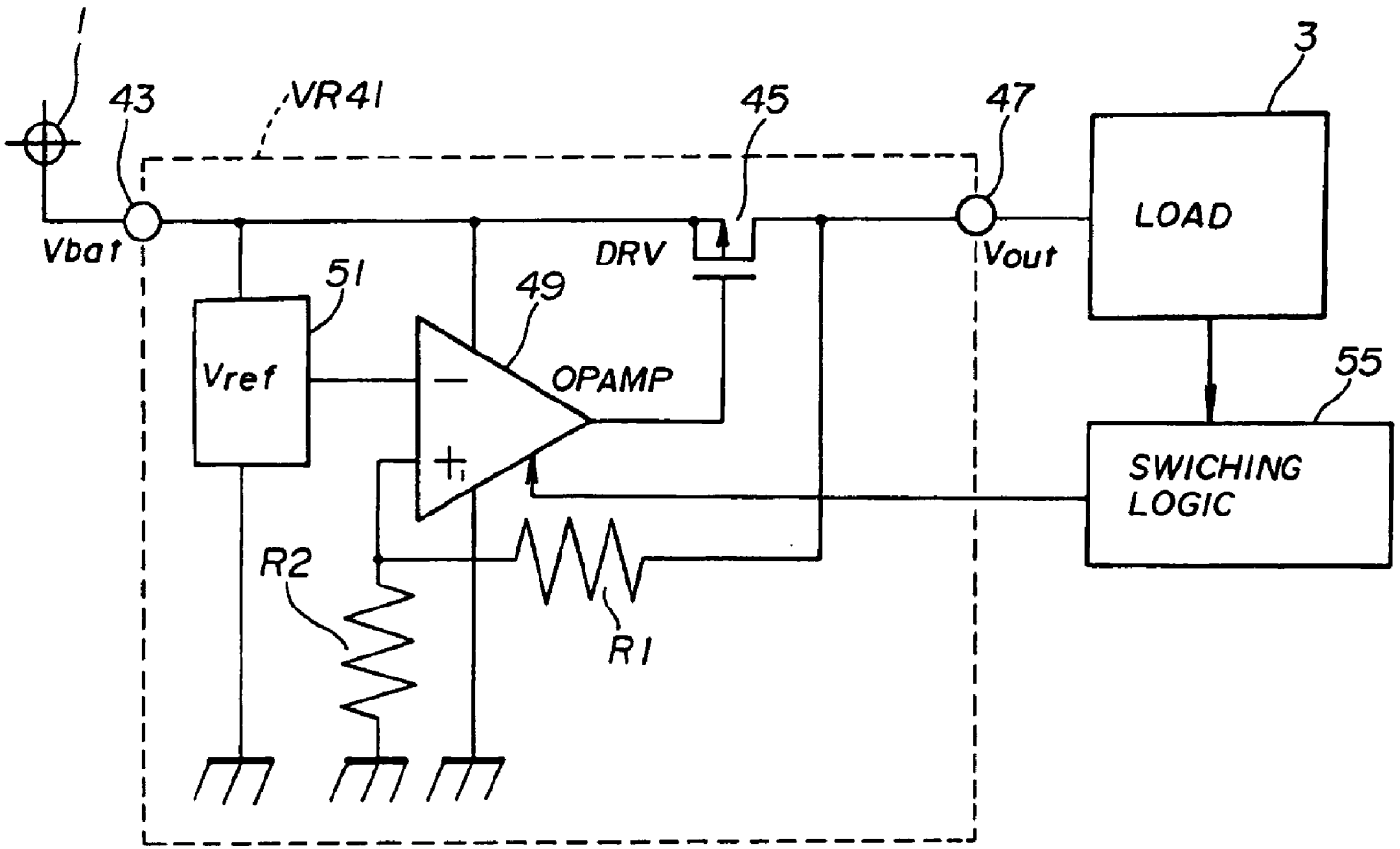
FIGS. 5A and 5B are circuit diagrams showing a second embodiment of the present invention.
Figure 5B:
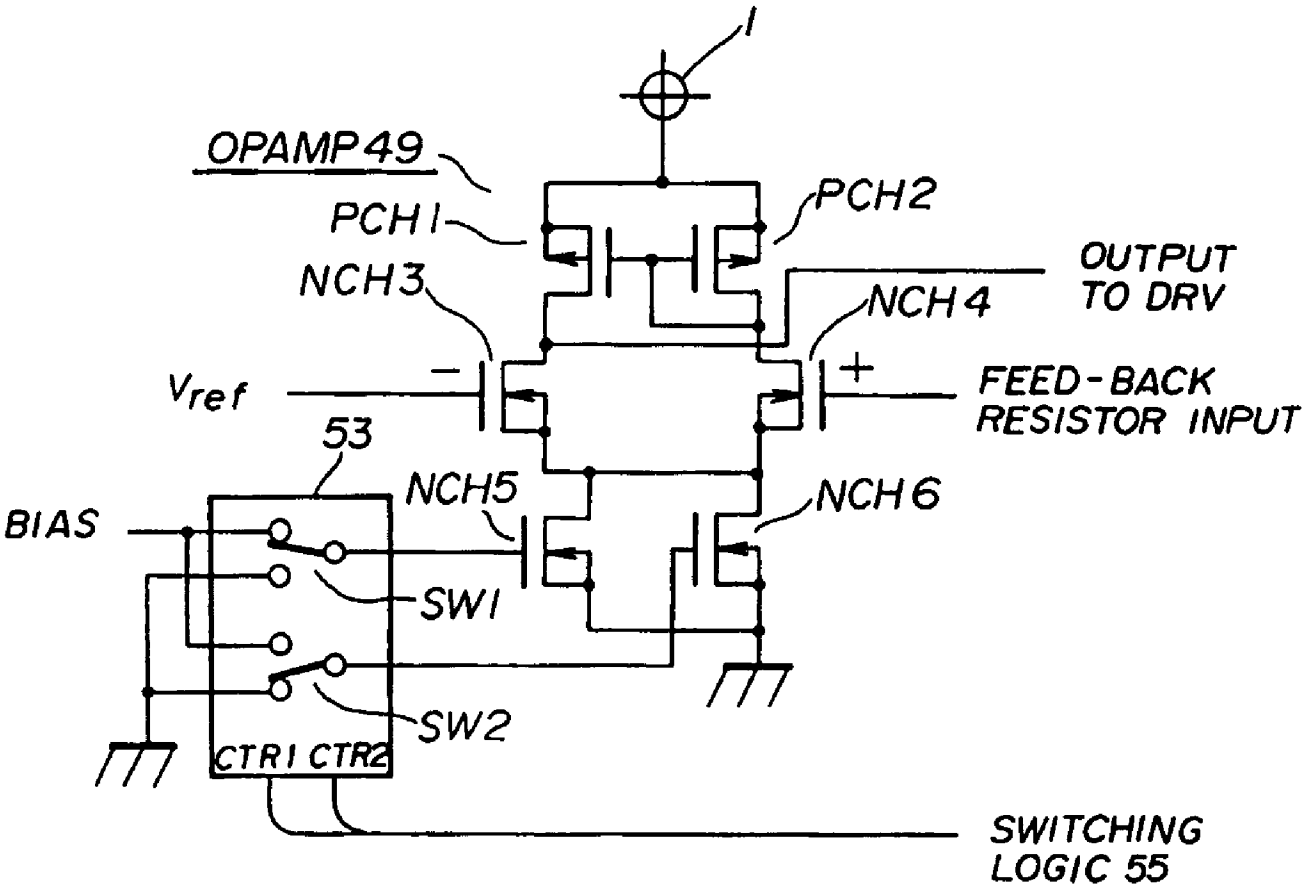

FIG. 5A is a circuit diagram showing the entirety of a second embodiment of the second aspect of the present invention, and FIG. 5B is a circuit diagram showing a configuration of an operational amplifier of the second embodiment shown in FIG. 5A.

A VR 41 is provided for stably supplying power to a load 3 from a power-source voltage applying terminal 1. The power-source voltage applying terminal 1 is connected to an input terminal (Vbat) 43, and the input terminal 43 is connected to an output terminal (Vout) 47 through an output transistor (P-channel MOS transistor: DRV) 45.

The VR 41 has the operation amplifier (OPAMP) 49. The output terminal of the operational amplifier 49 is connected to the gate electrode of the output transistor 45, the reference voltage is applied to the inverted input terminal of the operational amplifier 49 by the reference voltage part (Vref) 51, the voltage obtained as a result of the output voltage Vout of the output transistor 45 being divided by the resistors R1 and R2 is applied to the non-inverted input terminal of the operational amplifier 49, and the output voltage is controlled so that the voltage obtained as a result of the output voltage Vout being divided by the resistors R1 and R2 is equal to the reference voltage. The power-source voltage applying terminal 1 applies the power-source voltage to the operational amplifier 49 and reference voltage part 51.

The operational amplifier 49 will now be described with reference to FIG. 5B. The drains of a pair of NMOS transistors NCH3 and NCH4 for differential input are connected to the power-source voltage applying terminal 1 through PMOS transistors PCH1 and PCH2, respectively. The gate electrodes of the PMOS transistors PCH1 and PCH2 are connected to one another, and, are connected to the drain of any one of the NMOS transistors for input, for example, the NCH4. Thereby, the PMOS transistors PCH1 and PCH2 act as a load. The sources of the NMOS transistor NCH3 and NCH4 for input are connected to one another, and are grounded through NMOS transistors NCH5 and NCH6 connected in parallel. A connection point provided between the PMOS transistor PCH1 and NMOS transistor NCH3 acts as the output terminal and connected to the gate electrode of the output transistor (DRV) 45. The NMOS transistors NCH5 and NCH6 have different current capacities, and the current iH flowing through the NMOS transistor NCH5 is larger than the current iL flowing through the NMOS transistor NCH6.

Further, a switching circuit 53 including switches SW1 and SW2 connecting the gate electrodes of the NMOS transistors NCH5 and NCH6 to a bias-voltage applying terminal (BIAS) or the ground independently, respectively, is provided.

A switching logic circuit (switching LOGIC) 55 outputting switching signals to the switching circuit 53 is connected to the load 3. The switching circuit 53, based on the switching signal input to a control input terminal CRT1 from the switching logic circuit 55, turns the switch SW1 to the bias-voltage applying terminal (BIAS) when the signal input to the terminal CRT1 is "H" (in a high level) but to the ground when the signal input to terminal CRT1 is "L" (in a low level). Similarly, The switching circuit 53, based on the switching signal input to a control input terminal CRT2 from the switching logic circuit 55, turns the switch SW2 to the bias-voltage applying terminal (BIAS) when the signal input to the terminal CTR2 is "H" (in the high level) but to the ground when the signal input to the terminal CTR2 is "L" (in the low level). Thus, the voltages applied to the gate electrodes of the NMOS transistors NCH5 and NCH6 are controlled. Thereby, one of the NMOS transistors NCH5 and NCH6 is selected, and, thereby, the bias current flowing through the operation amplifier 49 can be switched.

The parallel circuit in the second aspect of the present invention comprises the NMOS transistors NCH5 and NCH6, and the switching logic circuit comprises the switching logic circuit 55.

In the second embodiment, the VR 41 enclosed by a broken line is formed on one chip.

Operations of the second embodiment will now be described.

When the load 3 is in the active mode, the switching signal "H" is output to the terminal CTR1 and the switching signal "L" is output to the terminal CRT2. Thereby, the gate of the NMOS transistor NCH5 is connected to the bias-voltage applying terminal (BIAS) and is turned on, while the gate of the NMOS transistor NCH6 is connected to the ground and is turned off. As mentioned above, the NMOS transistors NCH5 and NCH6 have different current capacities, and the current iH flowing through the NMOS transistor NCH5 is larger than the current iL flowing through the NMOS transistor NCH6. Accordingly, a larger bias current flows through the operational amplifier 49, and, thereby, the operational amplifier 49 operates with increased (higher or superior) PSRR and load transient responsivity.

When the load 3 is in the sleep mode, the switching signal "L" is output to the terminal CTR1 and the switching signal "H" is output to the terminal CTR2. Thereby, the gate of the NMOS transistor NCH6 is connected to the bias-voltage applying terminal (BIAS) and is turned on, while the gate of the NMOS transistor NCH5 is connected to the ground and is turned off. As mentioned above, the NMOS transistors NCH5 and NCH6 have different current capacities, and the current iH flowing through the NMOS transistor NCH5 is larger than the current iL flowing through the NMOS transistor NCH6. Accordingly, a smaller bias current flows through the operational amplifier 49, and, thereby, the operational amplifier 49 operates with decreased (lower or inferior) PSRR and load transient responsivity, but the power consumption thereof is reduced.

Also in the second embedment, similarly to the first embodiment shown in FIG. 2, control is made such that both the NMOS transistors NCH5 and NCH6 are turned on simultaneously for a certain interval when the condition (mode) of the load 3 is switched. Thereby, noise can be prevented from occurring.

Further, in the second embodiment, the offset voltage is only the offset voltage of the NMOS transistors NCH5 and NCH6, and, therefore, it is possible to further reduce the difference in the output voltage between before and after the switching.

Further, in the second embodiment, only one set of the reference voltage part, resistors and operational amplifier are needed. Accordingly, it is possible to achieve the constant voltage power supply on one chip with a further smaller area.

Thus, in the constant voltage power supply according to the first aspect of the present invention, a first constant voltage circuit having a large current consumption but having superior ripple removal rate and/or load transient responsively and a second constant voltage circuit having inferior ripple removal rate and/or load transient responsivity but having a small current consumption are provided, an output transistor common to those constant voltage circuits is provided, a switching units are provided for respective operational amplifiers and make connection and disconnection between output terminals of the operational amplifiers and the output transistor, respectively, and a switching logic circuit controls the switching units so that the optional amplifier of the first constant voltage circuit is connected to the output transistor when the load is in the operation condition but the operation amplifier of the second constant voltage circuit is connected to the output transistor when the load is in the standby condition. Thereby, it is possible to reduce the current consumption. Further, because the output transistor is common to the first and second constant voltage circuits, it is possible to reduce a chip area when the constant voltage power supply is achieved on one chip. Further, the switching units merely control application of a voltage to the gate electrode of the output transistor, the switching units need a small area on the chip. Accordingly, it is possible to prevent the chip area from increasing.

Further, the first and second operational amplifiers may have the same circuit configuration, but the first operational amplifier may use a transistor having a current supply capability larger than that of the second operational amplifiers. Thereby, the configurations of the first and second operational amplifiers, and, as a result, the configuration of the constant voltage power supply can be simplified.

Further, a buffer transistor having a large currently supply capability may be provided at an output stage of the first operational amplifier in comparison to the second operational amplifier. Thereby, it is possible to make the first and second operational amplifiers same as one another except the buffer transistor. Accordingly, manufacture thereof is easier.

Further, the switching logic circuit may control the switching units so that both the first and second operational amplifiers are connected to the output transistor for a period after the condition of the load is switched. Thereby, it is possible to avoid noise from occurring at the time of switching of the constant voltage circuits.

Further, the first and second constant voltage circuits may have interrupting circuits which interrupt passing-through currents thereof, respectively, and, the switching logic circuit may also control the interrupting circuits so as to turn on the interrupting circuit of the first constant voltage circuit and turn off the interrupting circuit of the second constant voltage circuit when the load is in the operation condition but turn off the interrupting circuit of the first constant voltage circuit and turn on the interrupting circuit of the second constant voltage circuit when the load is in the standby condition. Thereby, it is possible to further reduce the current consumption of the first and second constant voltage circuits when they are not selected.

A constant voltage power supply according to the second aspect of the present invention has a parallel circuit of two transistors provided in a current path of an operational amplifier and having different current capacities, and a switching logic circuit controlling the parallel circuit so that the transistor of the parallel circuit having a larger current capacity is turned on when the load is in the operational condition but the transistor of the parallel circuit having a smaller current capacity is turned on when the load is in the standby condition. Thereby, the current consumption of the constant voltage power supply is larger when the load is in the operation condition but is smaller when the load is in the standby condition. Accordingly, it is possible to reduce the current consumption. In this case, because only one set of operational amplifier and output transistor is provided, it is possible to reduce an area of a chip when the constant voltage power supply is achieved on the one chip.

Further, also in this case, the switching logic circuit may control the parallel circuit so that both transistors of the parallel circuit are turned on for a period after the condition of the load is switched. Thereby, it is possible to reduce noise in output of the output transistor at the time of switching of the parallel circuit.

The present invention is not limited to the above-described embodiments, and variations and modifications may be made without departing from the scope of the present invention.

The present application is based on Japanese priority application Nos. 11-224511 and 2000-221725, filed on Aug. 6, 1999 and Jul. 24, 2000, respectively, the entire contents of which are hereby incorporated by reference.

What is claimed is:

1. A constant voltage power supply supplying power to a load having an operation condition and a standby condition switched to one another, comprising:

a first constant voltage circuit applying a first reference voltage to a first input terminal of a first operational amplifier and a voltage obtained as a result of an output voltage being divided to a second input terminal of said first operational amplifier, and controlling an output transistor with an output of said first operational amplifier;

a second constant voltage circuit applying a second reference voltage to a first input terminal of a second operational amplifier and a voltage obtained as a result of the output voltage being divided to a second input terminal of said second operational amplifier, and controlling said ouptut transistor with an output of said second operational amplifier, a current consumption of said second constant voltage circuit being smaller than a current consumption of said first constant voltage circuit;

a switching part provided for said first and second operational amplifiers and switching connection between output terminals of said operational amplifiers and said output transistor; and a switching logic circuit controlling said switching part so that said first operational amplifier is connected to said output transistor when said load is in the operation condition but said second operational amplifier is connected to said output transistor when said load is in the standby condition.

2. The power supply as claimed in claim 1, wherein:

said first and second operational amplifiers have the same circuit configuration; and said first operational amplifier employs at least one transistor having a current supply capability larger than that of at least one transistor employed by said second operational amplifier.

3. The power supply as claimed in claim 1, wherein said first operational amplifier has a buffer transistor having a large current supply capability at an output stage in comparison to said second operational amplifier.

4. The power supply as claimed in claim 1, wherein said switching logic circuit controls said switching part so that both said first and second operational amplifiers are connected to said output transistor for a period after the condition of said load is switched.

5. The power supply as claimed in claim 1, wherein:

said first and second constant voltage circuits comprise interrupting circuits which interrupt passing-through currents thereof, respectively; and said switching logic circuit also controls said interrupting circuits so as to turn on the interrupting circuit of said first constant voltage circuit and turn off the interrupting circuit of said second constant voltage circuit when said load is in the operation condition but turn off the interrupting circuit of said first constant voltage circuit and turn on the interrupting circuit of said second constant voltage circuit when said load is in the standby condition.

6. The power supply as claimed in claim 5, wherein said switching logic circuit controls said switching part and said interrupting circuits so that both said first and second operational amplifiers are connected to said output transistor and also the interrupting circuits of both said first and second constant voltage circuits are turned on for a period after the condition of said load is switched.

7. A constant voltage power supply supplying power to a load having an operation condition and a standby condition switched to one another, applying a reference voltage to a first input terminal of an operational amplifier and a voltage obtained as a result of an output voltage being divided to a second input terminal of said operational amplifier, and controlling an output transistor with an output of said operational amplifier, said power supply comprising:

a parallel circuit of two transistors provided in a current path of said operational amplifier and having different current capacities; and a switching logic circuit controls said parallel circuit so that the transistor of said parallel circuit having a larger current capacity is turned on when said load is in the operational condition but the transistor of said parallel circuit having a smaller current capacity is turned on when said load is in the standby condition.

8. The power supply as claimed in claim 7, wherein said switching logic circuit controls said parallel circuit so that both transistors of said parallel circuit are turned on for a period after the condition of said load is switched.

*9. A constant voltage power supply comprising:*

*a first constant voltage circuit applying a first reference voltage to a first input terminal of a first operational amplifier and a voltage obtained as a result of an output voltage being divided to a second input terminal of said first operational amplifier, and controlling a first output transistor with an output of said first operational amplifier;*

*a second constant voltage circuit applying a second reference voltage to a first input terminal of a second operational amplifier and a voltage obtained as a result of the output voltage being divided to a second input terminal of said second operational amplifier, and controlling a second output transistor with an output of said second operational amplifier; and*

*a part switching between outputs of said first constant voltage circuit and said second constant voltage circuit, and wherein said power supply is arranged such that a current consumption of said second constant voltage circuit is smaller than a current consumption of said first constant voltage circuit.*

*10. The power supply as claimed in claim 9, wherein:*

*said first and second operational amplifiers have the same circuit configuration; and*

*said first operational amplifier employs at least one transistor having a current supply capability larger than that of at least one transistor employed by said second operational amplifier.*

*11. The power supply as claimed in claim 9, wherein said first operational amplifier has a buffer transistor having a large current supply capability at an output stage in comparison to said second operational amplifier.*

*12. The power supply as claimed in claim 9, wherein:*

*said first and second constant voltage circuits comprise interrupting circuits which interrupt passing-through currents thereof, respectively; and*

*said interrupting circuits are controlled so as to turn on the interrupting circuit of said first constant voltage circuit and turn off the interrupting circuit of said second constant voltage circuit in a predetermined first condition, but turn off the interrupting circuit of said first constant voltage circuit and turn on the interrupting circuit of said second constant voltage circuit in a predetermined second condition.*

*13. A constant voltage power supply comprising:*

*a first constant voltage circuit applying a first reference voltage to a first input terminal of a first operational amplifier and a voltage obtained as a result of an output voltage being divided to a second input terminal of said first operational amplifier, and controlling an output transistor with an output of said first operational amplifier;*

*a second constant voltage circuit applying a second reference voltage to a first input terminal of a second operational amplifier and a voltage obtained as a result of the output voltage being divided to a second input terminal of said second operational amplifier; and*

*a part switching between outputs of said first constant voltage circuit and said second constant voltage circuit, and wherein said power supply is arranged such that a current consumption of said second constant voltage circuit is smaller than a current consumption of said first constant voltage circuit.*

* * * * *